United States Patent
Zhang (10) Patent No.: US 7,213,139 B2
(45) Date of Patent: May 1, 2007

(54) SYSTEM FOR GATHERING AND STORING INTERNAL AND PERIPHERAL COMPONENTS CONFIGURATION AND INITIALIZATION INFORMATION FOR SUBSEQUENT FAST START-UP DURING FIRST EXECUTION OF FAST START-UP

(75) Inventor: JianHui Zhang, Beijing (CN)

(73) Assignee: Legend (Beijing) Limited (CN)

( * ) Notice: Subject to any disclaimer, the term of this patent is extended or adjusted under 35 U.S.C. 154(b) by 0 days.

(21) Appl. No.: 10/487,654

(22) PCT Filed: Aug. 22, 2001

(86) PCT No.: PCT/CN01/01263

§ 371 (c)(1), (2), (4) Date: Aug. 25, 2004

(87) PCT Pub. No.: WO03/023610

PCT Pub. Date: Mar. 20, 2003

(65) Prior Publication Data

US 2005/0015215 A1   Jan. 20, 2005

(51) Int. Cl.
*G06F 9/00* (2006.01)

(52) U.S. Cl. .................... 713/1; 713/1; 713/2
(58) Field of Classification Search .......... 713/1, 713/2, 100
See application file for complete search history.

(56) References Cited

U.S. PATENT DOCUMENTS

| | | | | |
|---|---|---|---|---|
| 5,938,764 A | * | 8/1999 | Klein | 713/1 |
| 5,978,913 A | * | 11/1999 | Broyles et al. | 713/2 |
| 6,434,696 B1 | * | 8/2002 | Kang | 713/2 |
| 6,598,159 B1 | * | 7/2003 | McAlister et al. | 713/2 |
| 6,718,461 B1 | * | 4/2004 | Ewertz | 713/1 |
| 6,865,669 B1 | * | 3/2005 | Mahmoud | 713/1 |

* cited by examiner

Primary Examiner—Sean Weinman
(74) Attorney, Agent, or Firm—Schmeiser, Olsen & Watts (57) ABSTRACT

A method of computer start-up, using the configuration information of the internal and peripheral components of the computer system and information required for executing initialization of these components, and performing fast test and initialization of the components of the system. The information is pre-stored in the computer system. The present invention can perform fast start-up of the computer, significantly reduce the time needed to start up the computer, improve the efficiency of start-up of the computer, and save the waiting time for users.

18 Claims, 4 Drawing Sheets

A comparison table of the start-up times of the BOOTEASY fast mode and normal mode (sec.)

| serial No. | configuration of the computer | cold start by pressing Power ON | | Warm start by pressing the Reset key | | Warm start by pressing Alt+Ctrl+Del | |
|---|---|---|---|---|---|---|---|
| | | normal mode | fast mode | normal mode | fast mode | normal mode | fast mode |
| 1 | 810MB Pentium III CPU600MEB DIMM128M, no Floppy, no HD, no CD-ROM, no plug-in card | 26.57 | 2.79 | 26.17 | 2.55 | 8.85 | 2.28 |
| 2 | 810MB Pentium III CPU600MEB DIMM128M, MAXTOR 20GHD, 5400RPM | 25.93 | 7.91 | 25.6 | 3.72 | 8.22 | 3.33 |
| 3 | 810MB Pentium III 600MEB DIMM128M, Maxtor 20G 5400RPM HD ASUS 40X MAX CDROM | 24.99 | 7.35 | 25.42 | 3.54 | 8.09 | 3.31 |
| 4 | 810MB Pentium III 600MEB 128M DIMM Seagate U6 40.8G ST340810A HD ASUS 40X Max CDROM | 26.28 | 6.29 | 26.3 | 3.79 | 8.79 | 3.55 |
| 5 | 810MB Pentium III 600MEB DIMM128M, ASUS 40X MAX | 26.38 | 5.23 | 26.4 | 3.67 | 8.37 | 3.37 |
| 6 | 810MB Pentium III 600MEB DIMM 128M, Acer 24X | 26.47 | 5.5 | 25.73 | 3.75 | 8.53 | 3.4 |
| 7 | 810MB Pentium III 600MEB 128M DIMM, ASUS 40X MAX CDROM PCI display card 9680 | 25.66 | 5.41 | 25.47 | 3.87 | 8.1 | 3.56 |
| 8 | 810MB Pentium III 600MEB DIMM128M, ASUS 40X MAX CDROM PCI display card GD5449 | 25.73 | 5.34 | 26.09 | 3.73 | 8.23 | 3.43 |

SYSTEM FOR GATHERING AND STORING INTERNAL AND PERIPHERAL COMPONENTS CONFIGURATION AND INITIALIZATION INFORMATION FOR SUBSEQUENT FAST START-UP DURING FIRST EXECUTION OF FAST START-UP

TECHNICAL FIELD

The present invention relates to a method of computer start-up, and particularly to a method of performing fast test and initialization of the system components of a computer during the start-up.

BACKGROUND ART

Currently, computer technology is rapidly developing, the speed of CPU, the speed of bus, the capacity of storage device, the integration level of elements and devices, as well as the costs of components have been improving significantly. Software technology is also developing dramatically evolving from the initial DOS into several generations of the WINDOWS operating system, and there are various application software having sophisticated functionality. However, the start-up time of the personal computer system becomes longer and longer, without any substantive development. In conventional BIOS, many operations are necessary during system start-up. It takes about 40 seconds to one minute to test the kernel components of the system first, to initialize the peripherals and to warm up the hard disk of the computer finally. The system takes long start-up time for many reasons, with the increase of the speed of the components and the enlargement of the capacity, the devices integrated become numerous as well, which making the workload of and the requirements to the BIOS (basic input and output system) of the computer higher and higher in order to manage individual components; for example, the initialization of a large amount of power supply management and individual components, and the arduous tasks of the compression and decompression of the BIOS per se. A poll among the clients reveals that a faster speed of the system start-up is often expected by users of PC, whether it is a cold start or a waking-up from the waiting state or sleep state.

In practical cases, a system ordinarily configured by a user is relatively stable, and its components are not frequently changed, it will be unnecessary to redetect the existence of those components and their configuration at each start-up, since it will waste a lot of time for the user to wait the start-up of the computer. The start-up of a computer system shall pass through a series of test and initialization operations. For example, in the POST (Power-On Self Test) procedure of personal computers, it is necessary to perform the test and initialization of the memory, CPU, hard disk, optical disk drive, PCI plug-in card, main control chip and a plurality of peripherals. The proper initialization of those components is the basis of the normal operation of the computer system, therefore is necessary. However, for a specific computer of a specific user, what are tested and initialized at power-on of the computer every day are the same group of memories, the same set of main control chips, the same CPU, the same optical disk drive and hard disk, the same PCI plug-in card and the same peripherals, that is, the same test operations are performed at the power-on of the computer system every day, and the user waits for the processing of the components one by one by the system, thus the time of the user is wasted by repetitive operations, since the configuration of an ordinary computer is not changed frequently.

SUMMARY OF THE INVENTION

It is an object of the present invention to provide a method for fast start-up of a computer, thereby the start-up time of the computer can be reduced significantly, the start-up efficiency of the computer can be enhanced and the waiting time can be saved for the user.

The technical solution of the present invention is as follows:

The method for computer start-up according to the present invention comprises:

performing fast test and initialization of each of the components of the system by the use of the configuration information of the internal and external components of the computer system and information required for executing initialization of each of the components, said information is pre-stored within the computer system.

Said information can be obtained in the test and initialization of each of the components during the normal start-up procedure of the computer system, or obtained by other ways and pre-stored in the computer. For computer apparatus of fixed configuration, said information is also fixed, for computers with configuration necessary to be changed, said information obtained by testing is also changed.

An alternative method for computer start-up according to the present invention comprises:

(1) First test step for testing whether the current start-up is in fast start-up mode or in normal start-up mode by the computer, in which the start-up mode is preset by the user in a setup step, and going to step (3) if the current start-up is in fast start-up mode, or going to step (2) if it is in normal start-up mode;

(2) Normal start-up step for performing a full test and initialization of the system components;

(3) Second test step for testing whether the current start-up is the first start-up after the setting of the fast set-up mode by the computer, going to step (4) if so, otherwise going to step (5);

(4) Normal start-up and storing step for executing the normal start-up step to obtain the configuration information of the internal and peripheral components of said computer system and necessary information for initializing components, and storing said information in the non-volatile of memory the computer;

(5) Fast start-up step for fast performing the test and initialization of the system components by utilizing said information obtained and stored in the computer in step (4).

In the present invention, the presetting of the current start-up mode may be executed by pressing a predetermined hot key on a keyboard by a user within a predetermined time period after the computer is powered or reset to enter a setup interface; and the computer is started up with the start-up mode set in the previous presetting if the hot key is not pressed within the predetermined time period. The setup interface may also be entered by other manners than the use of a hot key, for example, the start-up mode setup interface may be entered by executing a setup software at any time during the running of the computer.

The presetting step may also be executed by setting an option relating to the start-up mode in the COMS setup interface, thus the start-up mode can be set by pressing a hot key for CMOS SETUP by the user. The start-up mode may also be set by employing other schemes. It is not necessary for a user to set the start-up mode at each start-up. After each time a start-up mode is set, the computer stars up according to this mode until a new start-up mode is set.

In the present invention, the non-volatile memory used for storing information may be the system BIOS chip, that is, a software for implementing the present invention can be integrated directly into the BIOS software and written into the system BIOS chip. Preferably, the non-volatile memory chip or the BIOS chip may be a Flash chip or non-dynamically refreshing RAM memory chip. A Flash chip is a high speed erasable and alterable memory, and is also called a flash memory, which is a non-volatile memory capable of being erased as a whole or in partitions and reprogrammed in bytes.

According to an embodiment of the present invention, during the start-up of a computer, said first test step includes testing a high speed start-up flag which is preset in the computer based on said setup step, when this flag indicates start-up according to the normal start-up step, the computer is started up according to the normal start-up procedure.

In an embodiment of the present invention, said second test step includes testing a first time start-up flag preset in the computer, when this first time start-up flag indicates that the current start-up is a non-first start-up after the step of setting computer to the fast start-up, the computer performs fast start-up by employing the data information stored in the non-volatile memory. The flag was set after said setup step. This flag is set after said setup step. Generally, this flag is set automatically by the computer, when the first start-up is completed, this flag is updated, and the current start-up can recognized as non-first start-up based on this flag in the next start-up.

In an embodiment of the present invention, said normal start-up and storing step in the start-up procedure comprises:
  testing a plurality of configuration parameters of the components;
  writing the detected configuration parameters of the component into the non-volatile memory chip on the mother board of the computer and into the register of the controller of the component.

In this embodiment, said fast start-up step comprises:
  reading the configuration parameters of the component from the non-volatile memory chip;
  writing the read out configuration parameters into the registers of the controller of the component;
  performing necessary initialization processing for the component.

In an embodiment of the present invention, said normal start-up and storing step comprises:
  reading the configuration parameters from the component, and performing configuration based on the configuration parameters;
  writing the configuration parameters into the non-volatile memory chip.

In this embodiment, said fast start-up step comprises:
  reading the configuration parameters of the component from the non-volatile memory chip of the system;
  configuring the component based on the configuration parameters.

In an embodiment of the present invention, in the start-up procedure of the computer, said normal start-up and storing step comprises:
  testing the component in normal mode, i.e., performing tests on the component performed in the normal start-up step;
  determining the state of the component, and executing corresponding initialization program based on its status;
  storing the status flag bits of the component in the non-volatile memory chip.

In this embodiment, said fast start-up step comprises:
  reading the status flag bits from the non-volatile memory chip, and invoking corresponding initialization program according to said status flag bits;
  executing the initialization program to initialize the component.

Three procedures for performing test and/or initialization of the components in a computer during start-up are mentioned in the above. Generally speaking, one of the three modes can be adopted by any of the components in the computer. However, it may be more appropriate for some components to adopt a certain one of those modes.

In an embodiment of the present invention, before the configuration parameters or initialization program flags of all the components are written into the non-volatile memory chip, they are collectively written in a segment of the memory of the computer, and they are written into a segment of the non-volatile memory chip when the configuration parameters or initialization program flags of all components have been written into this segment of the memory.

In the present invention, said computer components may include a central processing unit (CPU), a memory, a keyboard, a mouse, an IDE device, an SCSI device, a floppy disk drive, a serial communication port, a parallel communication port, a USB device, a sound card which is a plug-in card or is embedded in computer mother board, a network interface card, a display interface card and a modem. Therefore, the present invention is adapted to be used with any computer internal and peripheral components.

In an embodiment of the present invention, the method of the present invention is executed in the computer power-on self test (POST) procedure.

In the present invention, when a user sets the computer to use the normal start-up mode, the computer is started up according to the normal start-up step. Therefore, the method of the present invention can be enabled or disabled by the user of the computer, when the method is disabled, the computer starts-up according to the normal start-up step to perform a full test and initialization of each of the components of the system. For example, the function of the present invention can be enabled or disabled by a user in the CMOS SETUP at the power-on of the computer, in order to ensure that the normal start-up step can still be executed when the system configuration of the computer is altered.

The present invention is based on the practical situation where the computer housing is usually not opened and the configuration of the system hardware is usually not changed by the user, so that the data detected and acquired at the first start-up are collected and stored, and can be directly and automatically employed at each start-up of the computer in the future. When a computer is started up by the use of the method of the present invention for the first time, the test of each of the components of the computer system and the initialization of the peripherals are performed according to the normal start-up step, such that each of the components is changed from the initial state after power-on or resetting to the normal operating state; after the completion of the initialization of each of the components, all the information of the peripherals and the results of initialization are stored in the non-volatile memory, the BIOS boots the operating system and hands over the control to the operating system. It is a main object of the present invention to reduce the time from the power-on or resetting of the computer to the booting of the operating system. At succeeding start-up, the repetitive operations are no more performed by the BIOS, and the test information and initialization information of each of the components in the system stored in the non-volatile memory are directly utilized to achieve the fast test and initialization of each of the components, thereby entering into a "high way" of the start-up of the computer. Therefore, in a power-on start-up after the first fast start-up after the computer is set to fast start-up by the user, the whole POST procedure takes only about 4 or 5 seconds.

No compatibility requirement for the hardware and software is required by the present invention, thus the performance is stable and reliable.

The present invention brings about a revolutionary power-on mode for the user to save large amount of start-up time and improve the start-up efficiency of computers.

DESCRIPTION OF THE PREFERRED EMBODIMENTS

Figure 1:
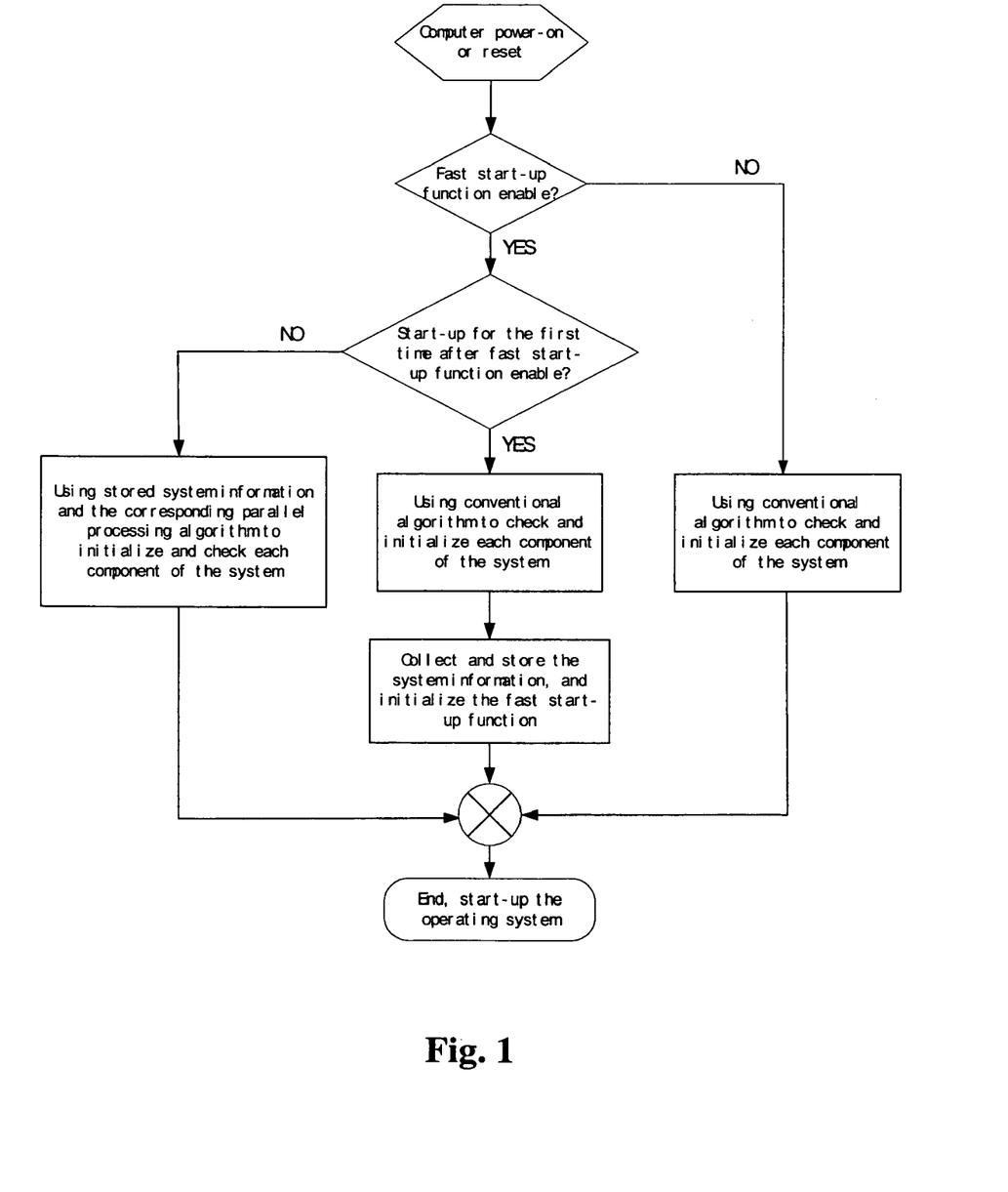
FIG. 1 is a basic flow chart of the start-up of a computer.

In a normal start-up procedure, the start-up of a computer shall first pass a self test procedure of the basic devices, which is called a Power-On Self Test procedure traditionally. This procedure is performed by the basic input/output system (BIOS) of the computer system. The BIOS performs necessary test and initialization on each of the components of the system in turn, and converts their states from the undefined state at time of power-on to the normal operating state by the use of conventional algorithms, then the operating system is started, and the POST procedure is completed. All the information required by the start-up procedure (e.g., the POST procedure) are recorded automatically by the hardware per se in the present invention, stored in a dedicated memory space, and then invoked from the dedicated memory directly at each time of start-up. Thus the original procedure of testing the hardware becomes a procedure of reading the memory, thereby the start-up speed can be significantly enhanced. FIG. 1 illustrates a start-up procedure of a computer. In the present invention, the test or initialization procedure of each of the components is accelerated by saving the information acquired in the test or initialization procedure of each of the components and invoking the saved information at the next start-up, as well as using corresponding parallel processing algorithms.

One most typical embodiment of the present invention is a fast start-up technique implemented on its product, i.e., the Legend computer, by the applicant of this application. This technique provides a new functionality for a user to accelerate the start-up speed of the computer. As compared to the conventional BIOS start-up, it can realize fast start-up with ease, and save time for the user, and its function is easy to be used. The CMOS SETUP can be entered by pressing the DEL key during the power-on self test procedure of the BIOS; if this BIOS supports fast start-up, an option for setting the fast start-up will be provided in the "Advanced BIOS Features"; if the fast start-up function is desired, setting this option to "Enabled". Then the computer is restarted, the BIOS will save the current system information and will realize fast start-up in the succeeding start-up by using said information.

Figure 2A:
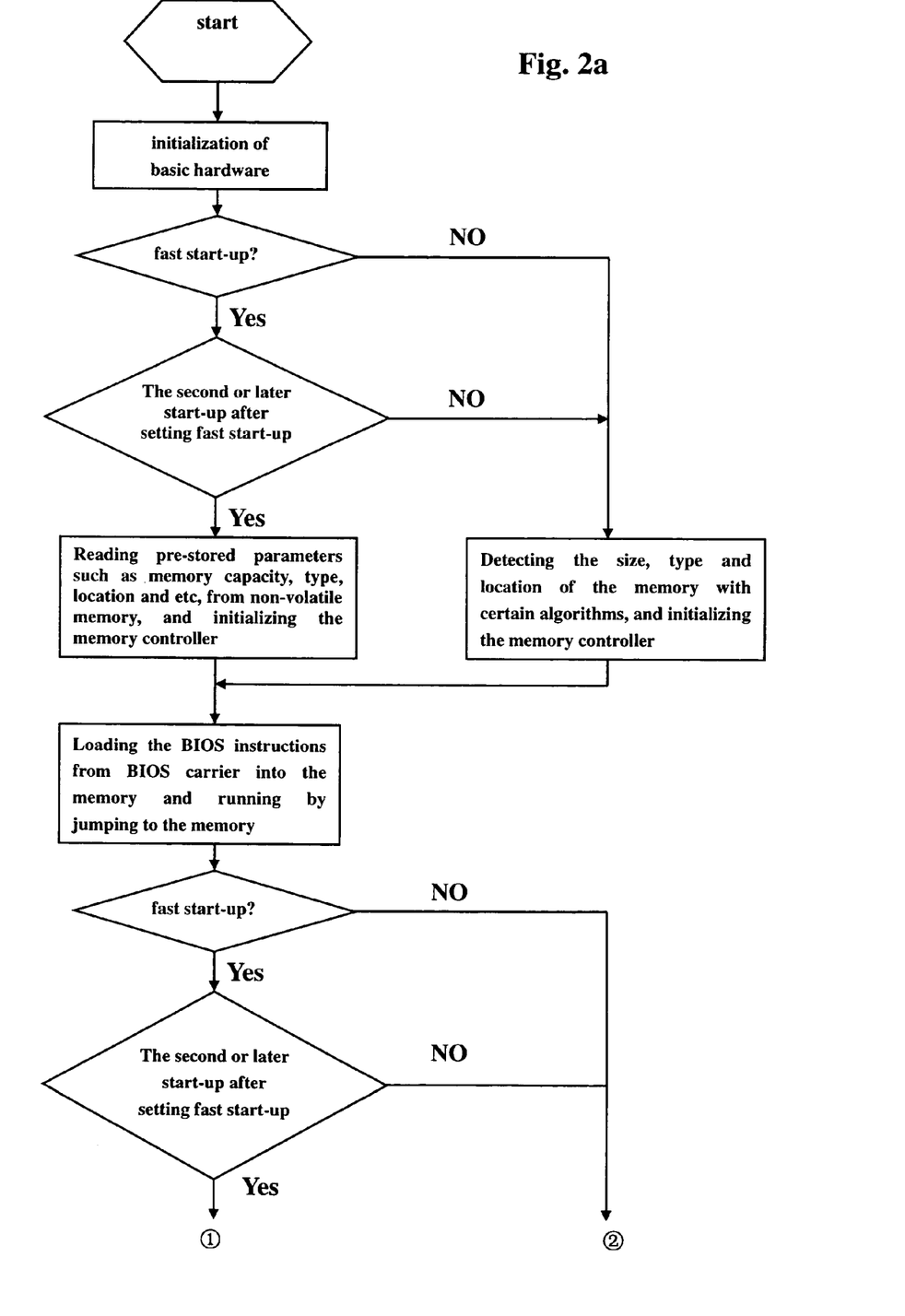
FIG. 2a and FIG. 2b are flow charts of an embodiment of the present invention.
Figure 2B:
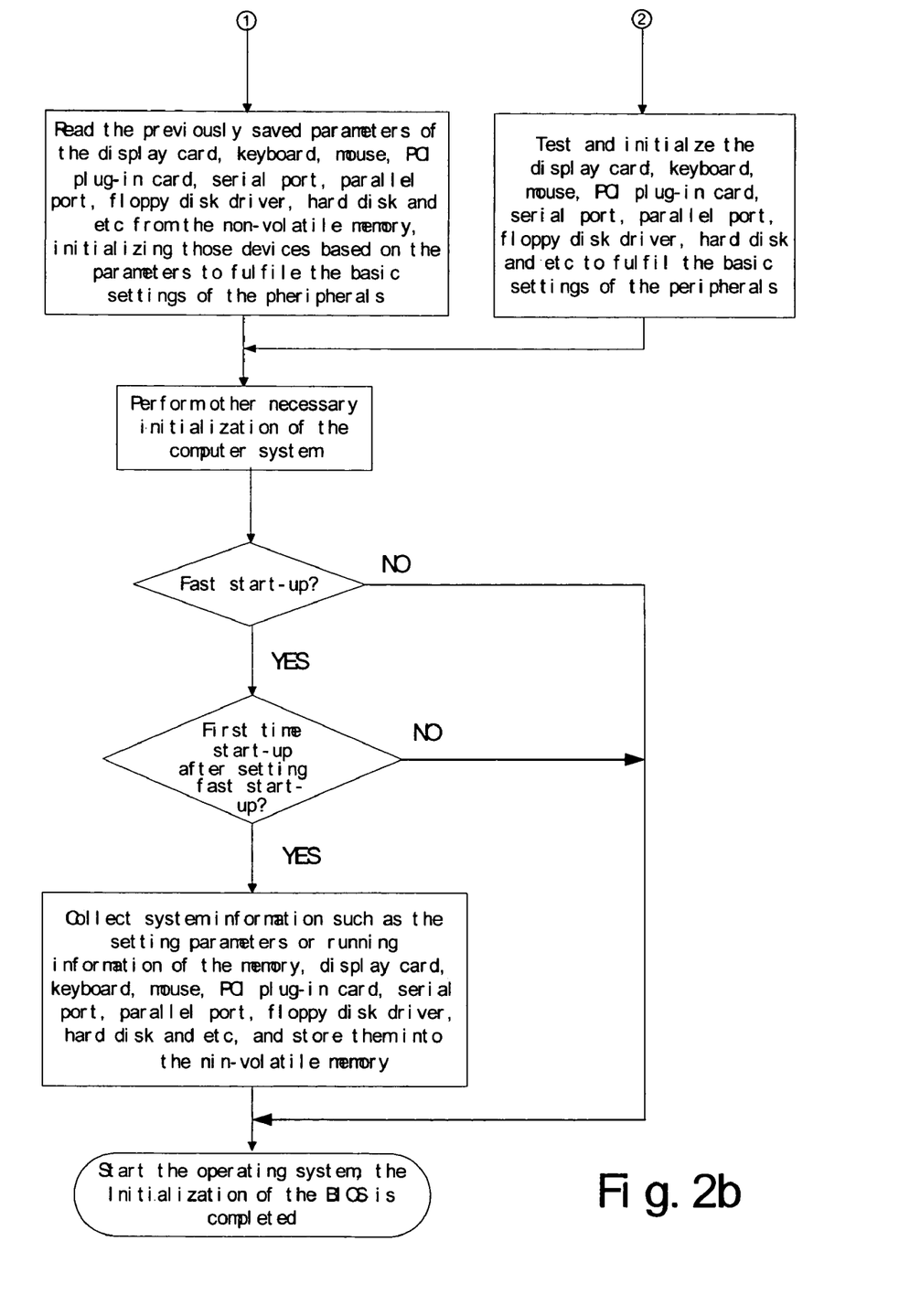

The technical solution of this embodiment is as follows.
In the embodiment of the present invention, the software for implementing fast start-up is stored in the BIOS chip. As shown in FIG. 2a and FIG. 2b, when the system is started up, i.e., in the POST procedure, the BIOS determines first whether the fast start-up function is enabled or disabled. Generally, the user preferably sets fast start-up function to "Disable" before modifying the system configuration, then shuts down the computer and modifies the configuration, makes the computer power-on again and sets the fast start-up function to "Enable". When the fast start-up function is enabled, the BIOS determines again whether the start-up is first time start-up after the fast start-up function is enabled, if not, the fast start-up is executed, if so, a normal start-up step is executed first, and the system will perform the initialization necessary for implementing the fast start-up function. At the same time of completing test and initialization of the system, all the data acquisition necessary for implementing fast start-up has been completed as well, the initialization ends, and at each succeeding start-up, what is needed is only to read out and utilize these data automatically.

The following is an example illustrating the test or initialization procedure of each of the components in the embodiment of the present invention.

1. Example of the Test of the Memory.

Firstly, in the normal start-up step, the BIOS tests the current system according to certain algorithms to obtain the parameters of the memory installed in the current system, such as the size, type, installed location and etc of the memory. After the test of the memory, the format of these parameters are converted to that of the contents of the corresponding memory control registers, and these parameters are written into the registers of the memory controller. These converted contents are stored, for example, in the BIOS chip on the mother board of the computer. These stored parameters are read out in the fast start-up step and directly filled into the registers of the memory controller, corresponding and necessary processing is performed on the memory to make it achieve the normal operating state, so as to realize fast test of the memory. For example, if it is detected that the current start-up is first time start-up after the setting of the computer to the fast start-up step, a plurality of configuration parameters of the memory are detected first, for example, the size, type and installation location of the memory; then the detected configuration parameters of the memory are written into the BIOS chip on the mother board of the computer, and written into the registers in the controller of the component. If it is detected that the current start-up is not first time start-up after the computer is set to the fast start-up step, for example, the second time start-up, then the stored memory configuration parameters are read out from the BIOS chip first; and then the read configuration parameters are written into the registers in the memory controller for performing necessary processing of the memory.

2. Example of Hard Disk Test.

The initialization of a hard disk is performed by configuring the control logic of the hard disk based on the type, size and other hardware features thereof. First, the BIOS reads out a parameter list from each hard disk (the parameter list of each hard disk contains 256 words, each word has its respective meaning, and denotes the hardware features of the hard disk). The BIOS analyzes the read parameters, converts the format of each of the parameters to that of the register of the hard disk control logic, and fills them into the registers. The BIOS saves the parameter lists read from the hard disk (a empty list is saved when no hard disk exists). During fast start-up, no parameters is read from the hard disk, but the saved parameter list is directly read out and is analyzed, then the format of each of the parameters is converted into that of the register of the hard disk control logic, and these converted parameters are filled into the register. For example, if it is defected by the computer that the current start-up is first time start-up after the computer is set to the fast start-up step, the configuration parameter are read out from the hard disk first and written into the BIOS chip; these parameters can be transferred to the FLASH memory via the internal memory; and the hard disk is configured based on these configuration parameters. If it is detected that the current start-up is not first time start-up after the computer is set to the fast start-up procedure, the configuration parameters are read out from the BIOS chip first and placed into the memory; then the hard disk is configured based on the read configuration parameters. Alternatively, the read configuration parameters may be directly written into the registers in the hard disk controller.

3. Example of Mouse Test.

The test of a mouse is as follows: Standard test is performed on the mouse first, and in the test, several situations may occur, operation 1 may be performed in the situation of status 1 of the mouse (e.g., the execution of the initialization program 1), operation 2 may be performed in the situation of status 2, and operation 3 may be performed in status 3. Flag bits of different mouse programs may be saved according to different situations during the start-up of the computer according to the present invention (e.g., saving 1, 2 and 3 as flag bits of the mouse). The flag bit of the mouse is read out during the fast start-up. If it is 1, operation 1 is performed, if it is 2, operation 2 is performed and if it is 3, operation 3 is performed, and the operation of testing the status of the mouse will not be performed. For example, if it is detected that the current start-up is first time start-up after the computer is set to the fast start-up step, standard test is performed on the mouse; the status of the mouse is determined and the status flag bits are stored into the BIOS chip. If it is detected that the current start-up is not first time start-up after the computer is set to the fast start-up step, for example, second time start-up, the status flag bits of the mouse are read out from the BIOS chip first, and corresponding initialization program is invoked based on the flag; then that initialization program is executed to initialize the mouse.

Fast start-up steps of other components are similar to the above-mentioned examples, and will not be detailed.

Figure 3:
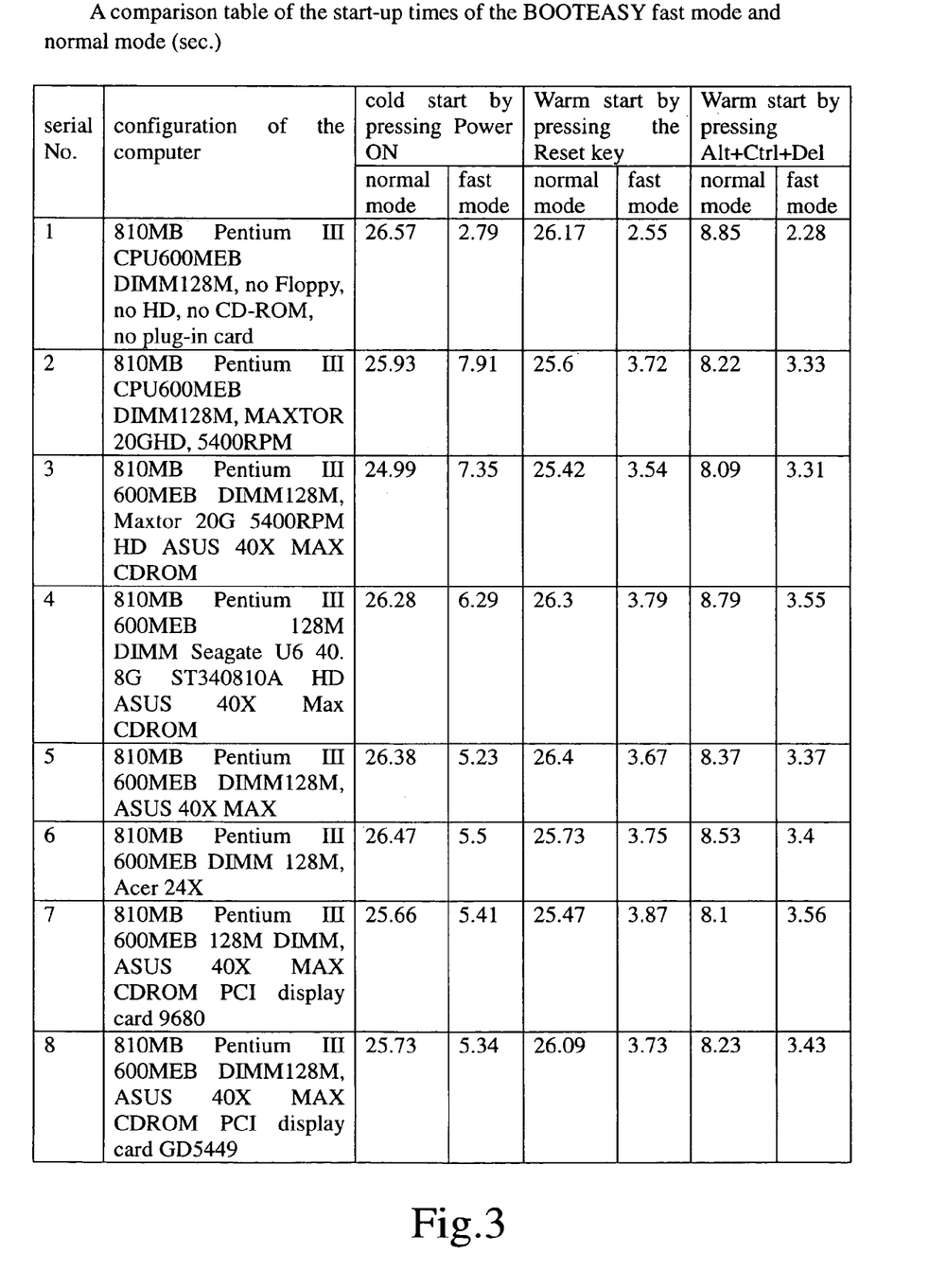
FIG. 3 is a table showing the comparison of the start-up times between the normal start-up modes and fast start-up modes of computers of eight different configurations according to an embodiment of the present invention.

FIG. 3 is a table showing the comparison of the start-up times between the start-up of normal mode and the start-up of fast mode in the computers of eight different configurations according to the embodiment of the present invention. The present invention can be implemented in the procedures of power-on start (cold start), start by pressing "RESET" key, and resetting start by keyboard (warm start). If can be seen that the time spent in the fast start-up steps in this embodiment is significantly less than that spent in the normal start-up steps no matter which start-up mode is used, especially in "cold start by pressing Power ON" and "warm start by pressing Reset key". The main reason is that many components and devices such as DIMM and SIO on the mother board will be tested one by one during the normal mode, thus the test spends a long time and a user has to wait for. In the fast start-up method of this embodiment, the test speed of these components can be significantly accelerated, and the test is both rapid and stable. In addition, the embodiment of the present invention also behaves satisfactorily in warm start-up. The technical effect of the present invention is subject to certain degree of limitation when display cards having long initialization time are employed, the latency time for testing peripherals such as hard disk and optical disk drive may also affect technical effects of the present invention.

Although it is very complicated to implement the functions of the present invention, it is very easy for a user to use them. A fast start-up can be performed conveniently by setting an on-off option in the CMOS SETUP. The user is only required to enter into CMOS SETUP, set the corresponding "fast start-up function" option to "Enabled", save the setting and restart the computer, then the computer automatically performs the initialization operation for implementing the fast start-up. After the completion of this start-up, a message will be displayed on a display screen to indicate that the fast start-up function has been successfully initialized, and the succeeding system start-up will be a wonderful fast start-up which reduces the start-up time of the computer from the traditionally more than 20 seconds or at least more than 10 seconds to 3–5 seconds. When a user needs to change the configuration of the computer or upgrade it, for example, replacing a hard disk, adding another network card, or upgrading a modem card, what is needed to do before upgrading is to enter the CMOS SETUP first to set the "fast start-up function" to "Disabled", save the setting and shut down the computer; then the upgrading of hardware is carried out; and this option is set to "Enabled" again after the completion of the upgrading, then the user can comfortably enjoy the convenience brought about by the fast start-up in the new configuration.

In this embodiment, the "fast start-up function" shall be set to "Disabled" before a user opens the computer housing and changes the configuration of the computer, and then this function is set to "Enabled" again after the configuration is changed and the computer is powered on, there will be no problem to use the fast start-up function in this way. However, if in the case where the "fast start-up function" is set to "Enabled", the computer is shut down, the computer housing is opened and the memory chips are changed, then when the computer is started again, the problem of being unable to restart the computer or the capacity of the detected memory being inconsistent with that of mounted memory on the mother board is possible to occur due to the inconsistency of the information required by fast start-up and stored in the BIOS chip with the current configuration of the computer. In the present embodiment, if the case that the computer is unable to restart is repeated for three times or more, the system will be automatically started by employing non-fast start-up mode in order to deal with this problem, and the configuration of the computer is test again, then the succeeding fast start-up will be performed normally. If the computer can start but the capacity of the detected memory is inconsistent with that of the actual memory, the system will operate abnormally, and problems of dead halt of the computer and etc will occur. In such a case, the user shall set the "fast start-up function" in the CMOS SETUP to "Disabled", restart the computer and set it to "Enabled" again, then the system will operate normally.

The invention claimed is:

1. A computer start-up method comprising:
   (1) first test step for testing whether a current start-up mode preset by a user is a fast start-up mode or a normal start-up mode, and going to step (3) if the current start-up mode is a fast start-up mode, or going to step (2) if it is a normal start-up mode;

(2) normal start-up step for performing a complete test and initialization of the components of the computer system;

(3) second test step for testing whether the current start-up is the first time start-up after the setting of the fast start-up mode, and going to step (4) if the current start-up is the first time start-up after the setting of the fast start-up mode, otherwise going to step (5);

(4) normal start-up and storing step for executing the normal start-up step to acquire configuration information of internal and peripheral components of said computer system and information required for initializing the components, and storing said information in a non-volatile memory of the computer; and (5) fast start-up step for fast implementing the test and initialization of the system components by the use of said information acquired and stored in the computer in step (4).

2. A computer start-up method comprising:

(1) first test step for testing whether a current start-up mode preset by a user is a fast start-up mode or a normal start-up mode, and going to step (3) if the current start-up mode is a fast start-up mode, or going to step (2) if it is a normal start-up mode;

(2) normal start-up step for performing a complete test and initialization of the components of the computer system;

(3) second test step for testing whether the current start-up is the first time start-up after the setting of the fast start-up mode, and going to step (4) if the current start-up is the first time start-up after the setting of the fast start-up mode, otherwise going to step (5);

(4) normal start-up and storing step for executing the normal start-up step to acquire configuration information of internal and peripheral components of said computer system and information required for initializing the components, and storing said information in a non-volatile memory of the computer; and (5) fast start-up step for fast implementing the test and initialization of the system components by the use of said information acquired and stored in the computer in step (4), wherein the presetting of the current start-up mode is executed by pressing a predetermined hot key on a keyboard by a user within a predetermined time period after the computer is powered or reset; and the computer is started up with the start-up mode set in the previous presetting if the hot key is not pressed within the predetermined time period.

3. The computer start-up method according to claim 1, wherein said first test step comprises testing a fast start-up flag preset in the computer based on said setting step.

4. The computer start-up method according to claim 1, wherein said second test step comprises testing a first time start-up flag preset in the computer, and the flag being set after said setting step.

5. A computer start-up method comprising: (1) first test step for testing whether a current start-up mode preset by a user is a fast start-up mode or a normal start-up mode, and going to step (3) if the current start-up mode is a fast start-up mode, or going to step (2) if it is a normal start-up mode;

(2) normal start-up step for performing a complete test and initialization of the components of the computer system;

(3) second test step for testing whether the current start-up is the first time start-up after the setting of the fast start-up mode, and going to step (4) if the current start-up is the first time start-up after the setting of the fast start-up mode, otherwise going to step (5);

(4) normal start-up and storing step for executing the normal start-up step to acquire configuration information of internal and peripheral components of said computer system and information required for initializing the components, and storing said information in a non-volatile memory of the computer; and (5) fast start-up step for fast implementing the test and initialization of the system components by the use of said information acquired and stored in the computer in step (4), wherein the non-volatile memory for storing the information is a system BIOS chip.

6. The computer start-up method according to claim 1, wherein the non-volatile memory for storing the information is a FLASH chip or a non-dynamically refreshing RAM chip.

7. The computer start-up method according to claim 1, said normal start-up and storing step comprising steps of:
detecting a plurality of configuration parameters of the components; and
writing the detected configuration parameters of the components into the non-volatile memory on the mother board of the computer, and writing the detected configuration parameters of the components into the register in the controller of the component.

8. The computer start-up method according to claim 7, said fast start-up step comprising:
reading the configuration parameters of the component from the non-volatile memory;
writing the read configuration parameters into the register in the controller of the component; and
performing necessary initialization processing of the component.

9. The computer start-up method according to claim 1, said fast start-up step comprising:
reading the configuration parameters of the component from the non-volatile memory;
writing the read configuration parameters into the register in the controller of the component; and
performing necessary initialization processing of the component.

10. The computer start-up method according to claim 1, said normal start-up and storing step comprising:
reading the configuration parameters from a component and configuring the component based on the configuration parameters; and
writing the configuration parameters into the non-volatile memory.

11. The computer start-up method according to claim 10, said fast start-up step comprising steps of:
reading the configuration parameters of a component from the non-volatile memory of the system; and
configuring the component based on the configuration parameters.

12. The computer start-up method according to claim 1, said fast start-up step comprising steps of:
reading the configuration parameters of a component from the non-volatile memory of the system; and
configuring the component based on the configuration parameters.

13. The computer start-up method according to claim 1, said normal start-up and storing step comprising:
performing standard test on the component;

determining the status of the component, and executing corresponding initialization program based on the status thereof and storing the status flag bits of the component and writing them into the non-volatile memory.

14. The computer start-up method according to claim 13, said fast start-up step comprising:

reading the status flag bits of the component from the non-volatile memory, and invoking corresponding initialization program according to the status flag bits; and initializing the component by executing the initialization program.

15. The computer start-up method according to claim 1, said fast start-up step comprising:

reading the status flag bits of the component from the non-volatile memory, and invoking corresponding initialization program according to the status flag bits; and initializing the component by executing the initialization program.

16. The computer start-up method according to claim 1, wherein the configuration information or the information necessary for initialization of all the components are collectively written into a segment of the memory of the computer before being written into the non-volatile memory, and said information is collectively written into a segment in the non-volatile memory after the configuration parameters or initialization program flag of all the components having been written into this segment of the memory.

17. The computer start-up method according to claim 1, wherein the components of said computer includes a central processing unit (CPU), a memory, a keyboard, a mouse, an IDE device, an SCSI device, floppy disk drives, a serial communication port, a parallel communication port, a USB device, external plug-in or computer mother board embedded sound interface card, a network interface card, a display interface card and a modem.

18. The computer start-up method according to claim 1, wherein the method is executed during the power-on self test procedure of the computer.

* * * * *

UNITED STATES PATENT AND TRADEMARK OFFICE
CERTIFICATE OF CORRECTION

PATENT NO. : 7,213,139 B2  Page 1 of 1
APPLICATION NO. : 10/487654
DATED : May 1, 2007
INVENTOR(S) : Zhang

It is certified that error appears in the above-identified patent and that said Letters Patent is hereby corrected as shown below:

Column 3
Line 3, delete "stars" and insert -- starts --

Column 7
Line 11, delete "defected" and insert -- detected --

Signed and Sealed this

Thirtieth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,213,139 B2
APPLICATION NO. : 10/487654
DATED : May 1, 2007
INVENTOR(S) : Zhang It is certified that error appears in the above-identified patent and that said Letters Patent is hereby corrected as shown below:

<u>Column 3</u>
Line 3, delete "stars" and insert -- starts --

<u>Column 7</u>
Line 11, delete "defected" and insert -- detected --

This certificate supersedes the Certificate of Correction issued October 30, 2007.

Signed and Sealed this

Eighth Day of January, 2008

JON W. DUDAS
*Director of the United States Patent and Trademark Office*

UNITED STATES PATENT AND TRADEMARK OFFICE
CERTIFICATE OF CORRECTION

PATENT NO.        : 7,213,139 B2                                        Page 2 of 3
APPLICATION NO.   : 10/487654
DATED             : May 1, 2007
INVENTOR(S)       : Zhang It is certified that error appears in the above-identified patent and that said Letters Patent is hereby corrected as shown below:

Delete Drawing Sheet 1 because of the poor readability of the print and insert the corrected Drawing Sheet 1 below.

Fig. 1

UNITED STATES PATENT AND TRADEMARK OFFICE
CERTIFICATE OF CORRECTION

PATENT NO. : 7,213,139 B2
APPLICATION NO. : 10/487654
DATED : May 1, 2007
INVENTOR(S) : Zhang It is certified that error appears in the above-identified patent and that said Letters Patent is hereby corrected as shown below:

Delete Drawing Sheet 3 because of the poor readibility of the print and insert the corrected Drawing Sheet 3 below.

Fig. 2b